United States Patent Office 3,422,795
Patented Jan. 21, 1969

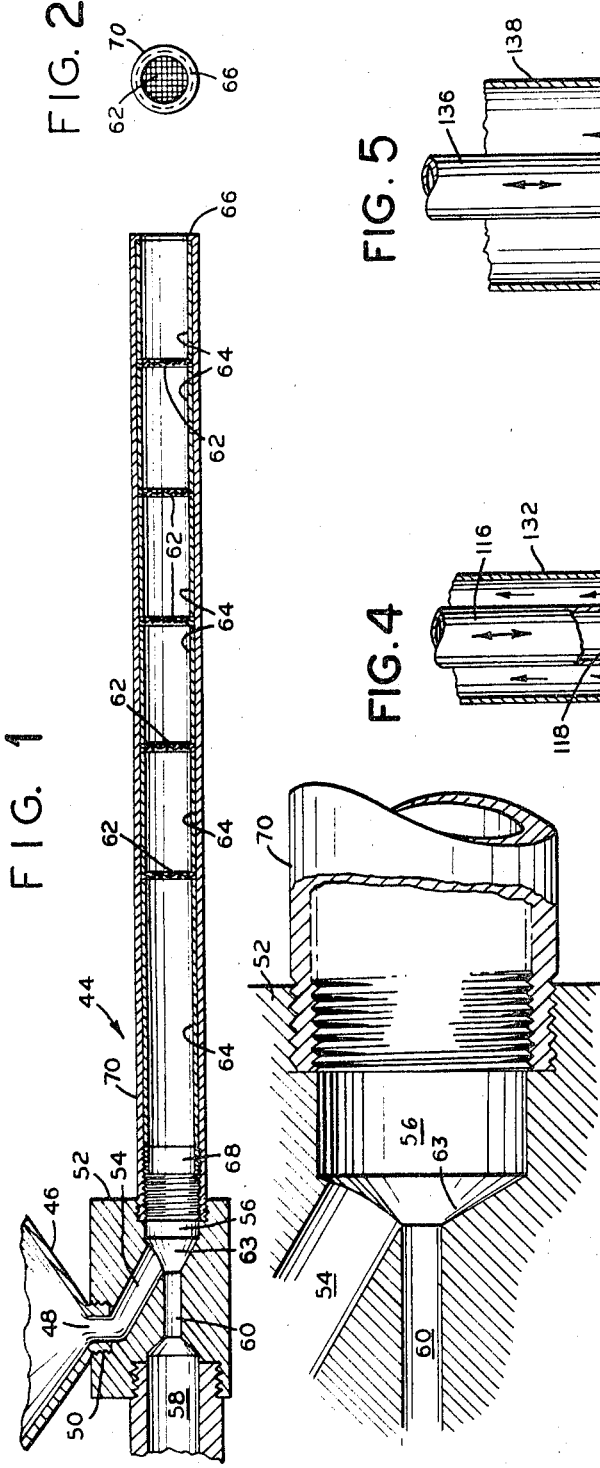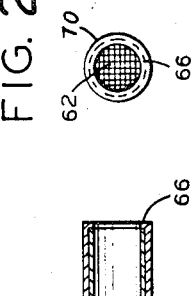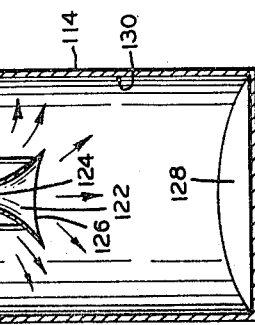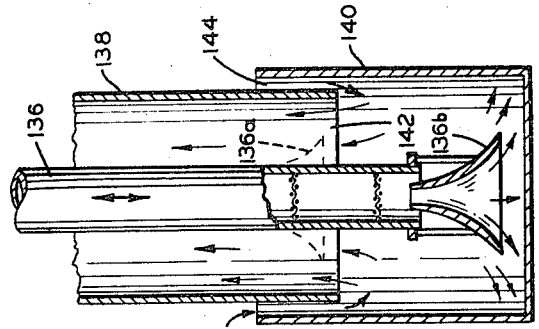

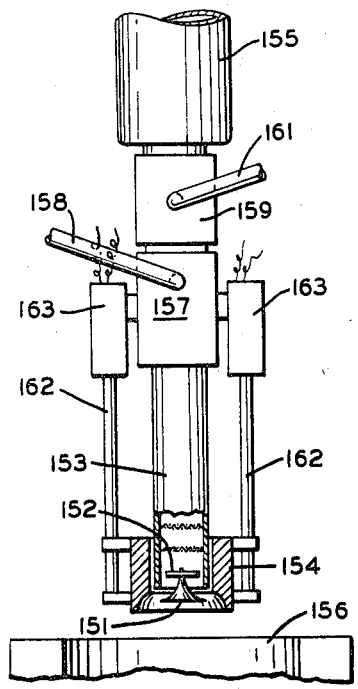
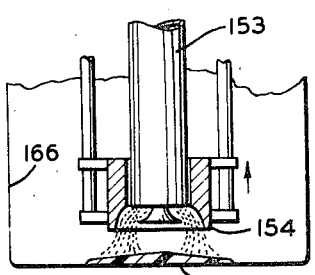
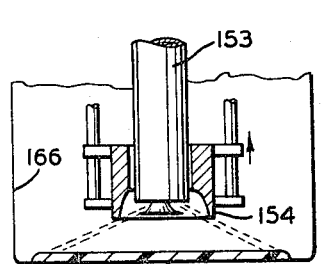
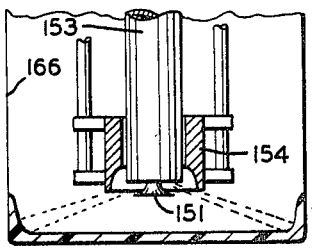
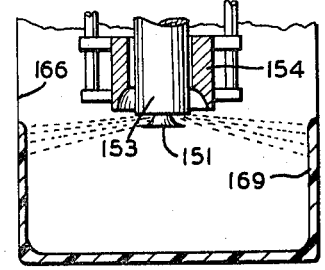
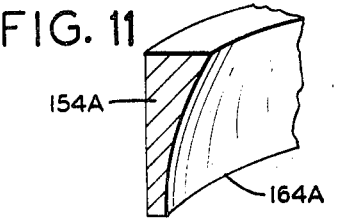
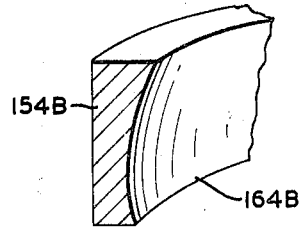
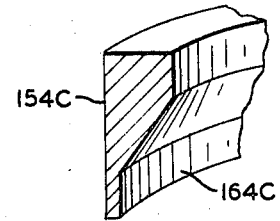
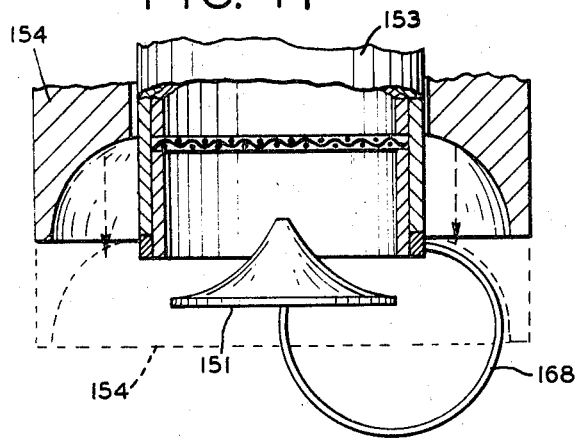
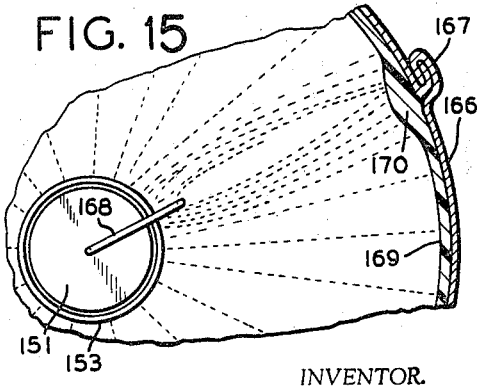

3,422,795
APPARATUS FOR COATING HOLLOW
OBJECTS WITH POWDER
Millard F. Smith, Westport, Conn.
(P.O. Box 295, Saugatuck, Conn. 06880)
Continuation-in-part of applications Ser. No. 255,601,
Feb. 1, 1963, Ser. No. 147,668, Oct. 25, 1961, and
Ser. No. 110,581, May 16, 1961. This application
Dec. 13, 1965, Ser. No. 513,366
U.S. Cl. 118—308    9 Claims
Int. Cl. B05b 7/14, 13/06; B05c 7/00

ABSTRACT OF THE DISCLOSURE

Apparatus for coating the inside of hollow objects with powder comprising a powder nozzle having flow straightening means to produce laminar flow of the powder and a smoothly flaring defector at the end of the nozzle to deflect the powder outwardly onto the interior of the heated hollow object.

---

This application is a continuation-in-part of my prior, co-pending applications Ser. No. 110,581, filed May 16, 1961 now abandoned; Ser. No. 147,668, filed Oct. 25, 1961 now U.S. Patent No. 3,222,725; and Ser. No. 225,-601, filed Feb. 1, 1963 now U.S. Patent No. 3,291,631.

This invention relates to coating apparatus, and particularly to apparatus for projecting a stream of solidifiable, finely divided coating material onto the heated internal surface of a concave object to form a thin, uniform continuous fused coating thereon, reinforced by portions of added thickness where needed.

The coatings applied by this invention may be separable and removable from the concave surface, as in bottle molding; or they may be permanently bonded, as in can coating techniques.

Prior coating techniques are wasteful, expensive and awkward, for they provide no convenient means for applying uniform coatings efficiently without wasting coating material.

In the past, hollow articles, such as bottles, jars, doll heads and body components, squeeze toys, collapsible squeeze tubes, boots, finger cots, baby dishes and the like were generally made by two methods; namely, blow molding and plastisol molding.

In these techniques, it is very difficult to control the uniformity of wall thickness. An even more difficult feat, with these methods, is to manufacture an article having predetermined different wall thicknesses so as to maximize strength and rigidity in certain areas of the molded article.

Prior art techniques permit powdered plastic material to be formed into coatings on objects only through the use of bulky, heavy and awkward apparatus, generally requiring large quantities of the powdered plastic material to be held in position adjacent the article to be coated for a substantial period of time, and often requiring a series of heating, coating and cooling steps to build up adequate coatings. The awkward and clumsy tanks and apparatus of the prior art are useful only for single unit or small batch coating operations, and cannot be employed for continuous production line coating of large quantities of articles. Furthermore, they allow very little control over the uniformity, smoothness or thickness of the coatings.

Accordingly, it is a principal object of the present invention to provide apparatus for applying coatings of uniform thickness, smoothness and continuity to concave objects of various shapes.

Another object of the invention is to provide apparatus for applying coatings to concave objects in continuous production line operations.

Another object of the invention is to provide apparatus for projecting powdered plastic material toward the object to be coated in a flowing stream of air or other gas, taking advantage of substantially laminar flow characteristics in the flowing stream to maintain the uniform predictability of the resulting coatings.

A further object of the invention is to provide apparatus of the above character incorporating projecting guns having flow straightening screens producing substantially laminar flow characteristics in the flowing stream of gas carrying the powdered plastic material toward the object to be coated.

Another object of the invention is to provide apparatus of the above character incorporating flow diverting surfaces cooperating with laminar flow inducing projecting guns and adapted to divert and direct the flowing stream of gas carrying the powdered plastic material toward various portions of the object to be coated.

A further object of the invention is to provide apparatus of the above character incorporating automatic feed devices providing relative motion between the plastic projecting apparatus and the object to be coated whereby continuous coatings may be applied over a large area of the coated object.

Other and more specific objects will be apparent from the features, elements, combinations and operating procedures disclosed in the following detailed description and shown in the drawings, in which:

FIGURE 1 is a cross-sectional side elevation view of an air-powder mixing chamber and stream-projecting gun employed in one embodiment of the invention;

FIGURE 2 is an end elevation view of the device shown in FIGURE 1;

FIGURE 3 is an enlarged fragmentary cross-sectional side elevation view of the air-powder mixing chamber employed in one form of the present invention;

FIGURE 4 is a cross-sectional side perspective view of a container coating apparatus of the present invention;

FIGURE 5 is a cross-sectional side elevation view of a modified form of the container coating apparatus in FIGURE 4;

FIGURE 6 is a fragmentary schematic side elevation view of apparatus useful in coating internal container surfaces in a further embodiment of the invention;

FIGURES 7, 8, 9 and 10 are similar fragmentary views showing the apparatus of FIGURE 6 in four successive stages of a container-coating cycle;

FIGURES 11, 12 and 13 are enlarged fragmentary sectional perspective views of modified forms of the redeflector ring shown in FIGURES 6–10;

FIGURE 14 is an enlarged fragmentary sectional side elevation view of a modified form of the apparatus of FIGURES 6–10; and FIGURE 15 is a fragmentary bottom plan view of the device of FIGURE 14 shown while a coating operation is in progress.

In all of the embodiments of the invention, a solidifiable powdered material, preferably powdered thermosetting plastic, is mixed in a flowing stream of gas such as compressed air, preferably directed through flow straightening means such as an arrayed plurality of transverse screens, and directed at a low velocity toward the concave surface to be coated.

*Removable concave coatings-bottle molding*

In accordance with the objects enumerated above, the novel apparatus of this invention involves spraying a finely divided thermosettable or thermoplastic fluid material, such as powdered polyethylene or polyvinyl chloride suspended in a flowing stream of gas, onto a surface having one or more predetermined temperature-controlled zones. These zones may be either heated or chilled, depending upon the material being used for molding. In one form of apparatus, the apparatus includes at least one cavity mold into which one or more delivery tubes are inserted sequentially. Solidifiable materials, such as liquid or powdered dry thermoplastic or thermosetting resins, plastisols, or molten metals, are conducted through these delivery tubes, to be sprayed through nozzles toward the walls of the cavity mold. Since the cavity walls are either heated or cooled to different degrees in different areas, such application of heat or cold solidifies the sprayed material to different thicknesses. Hence, by proper positioning of the nozzle in the delivery tube and the heating or cooling coils in the walls of the cavity mold, a molded item can be formed which has accurately positioned differing wall thicknesses. It is also possible, by this method, to mold articles with varying color tones, or varying wall material having different tensile strengths, differing resilience, and the like.

The refined embodiment of this invention involves a table containing a plurality of molds. A series of delivery tubes mounted on a rotatable rack are inserted sequentially into these cavity molds. By proper indexing with a control system, a main layer, one or more intermediate layers and a finish layer can be sprayed onto the mold walls, controlling the physical characteristics of the end product.

The process

The process effected by the apparatus just described may be generically described as one wherein finely divided liquid or powdered fluidized solid thermosolidifiable material is directed onto the walls of a cavity mold. If desired, the walls of the mold are heated or cooled to differing degrees in different predetermined zones so that an uneven deposition of material will be effected. By properly positioning the differing zones of heated or chilled surfaces, one can form a molded article having predetermined varied wall thickness.

The thermosolidifiable material that can be used may be any of the thermoplastic or thermosetting resins now available. Typical examples of thermoplastics are polyethylene, polypropylene, ethyl cellulose, cellulose acetate, cellulose propionate, cellulose acetate-butyrate, polyvinyl chloride, polyvinylindene chloride, polyvinyl acetate, the polyacrylates, the polystyrenes, the nylons, the fluorocarbons and mixtures. Examples of thermosetting plastics and resins are the plastisols, the melamines, the ureas, the polyesters, the alkyds, the epoxides, the phenolics and mixtures. When finely divided, powdered plastic coating materials are directed toward the molding surface in a flowing stream of gas, laminar flow is preferred and produces a coating of uniform thickness in many instances. The thermosolidifiable material may also be molten metal such as copper, lead, zinc, tin and others.

Process and apparatus variations

Variations in processing can also be effected. For example, a sequential delivery tube insertion technique can be used with a preliminary coating, an intermediate layer, and a finish coating. This stepwise coating provides a better control over wall thickness in certain instances.

Another variation involves the successive application of different thermosolidifiable materials. Alternatively, the same material, formulated with different melt indices, could be used. An apparatus variation would involve rotating each delivery tube during ejection so that a more uniform application of material is effected.

Another apparatus variation involves the use of a molding surface other than the interior of a cavity mold. Flat sheets, boxes, tubes and the like can be made using the temperature controlled moulding surface of this invention.

Various different methods and apparatus for delivering the powdered coating and molding material to the concave surface to be coated are shown in FIGURES 1–15.

The powdered coating material, which may range in particle size from sub-micron sizes up to 250 microns in diameter, is introduced to the flowing air stream at a velocity-reduction point, such as the abruptly widening region of a Venturi section of the conduit conveying the stream of air toward the coated object. This produces thorough mixing of the powdered coating material in the air stream, which then passes through a projecting tube or gun incorporating serially-arrayed flow-straightening members which induce the desired laminar flow characteristics, such as the screens shown in FIGURES 1, 4 and 5, for example.

The flowing stream may be constrained at the outlet end of the projecting gun or diverted laterally as shown in FIGURES 4–10 and 14; or it may be unconstrained, as shown in FIGURES 1 and 2. In each case the flowing stream of air carrying the powdered coating material is projected toward the surface of the object to be coated, which is preferably preheated by adjacent heating elements, by induction heating coils or by such means as radiant heating units. These heating elements bring the coated surface to a temperature at which the impinging powdered coating material will adhere and fuse thereto.

Relative motion between the impinging stream and the coated surface is generally desired, so that a continuously flowing stream can be used to coat a large area of the object's surface. Examples of coating apparatus providing such relative motion are illustrated in FIGURES 4, 5, 6–10, 14 and 15.

A schematic diagram of the laminar flow-inducing portion of a projecting gun employed in the present invention is shown in FIGURES 1 and 2. In these figures a tube 70 directs the stream of air and powdered coating material toward the coated surface, and is provided with longitudinally spaced transverse mesh screens 62 interposed in the path of the moving air stream.

The screens 62 are preferably arranged with their axes substantially parallel, and the mesh sizes of the screens are preferably selected to provide screen apertures about ten times the average diameter of the particles of coating material carried in the flowing air stream. Screens of this mesh size appear to provide optimum flow-straightening of the passing stream, while at the same time minimizing clogging or particle build up in the screen mesh.

After the air stream carrying the powdered coating material is directed through these spaced, longitudinally arrayed transverse screens, it passes through an exit orifice 66 toward the surface of the object to be coated.

The laminar-flow stream-projecting gun 44 shown in FIGURE 1 incorporates an "expansion" mixing chamber 56 in which the powdered coating material is introduced into the flowing air stream as it passes toward the flow-straightening screens 62 in the connecting projecting tube 70. A funnel-shaped hopper 46 for the powdered coating material has its outlet end 48 threaded into an aperture 50 in a mixing block 52 communicating with a powder feed passage 54 passing downwardly through the mixing block 52 and opening into the expansion mixing chamber 56. Compressed air from an air inlet conduit 58 is admitted to a reduced-diameter air feed passage 60 formed in the block 52 and opening into the expansion mixing chamber 56. The mixing chamber 56 is preferably formed with an internal diameter four or five times greater than the inside diameter of the air feed passage 60, and this change in diameter is achieved abruptly at the conical surface 63, which may diverge from the axis of air feed passage 60 by an angle in the neighborhood of 60°. The powder feed passage 54 opens through the conical surface 63 into the expansion mixing chamber 56, and the axis of powder feed passage 54 is preferably substantially normal to that portion of surface 63 through which it opens in the preferred embodiment of the invention fragmentarily illustrated in FIGURE 3. The abrupt change in diameter of the air feed passage 60 as it enlarges to form the expansion mixing chamber 56 produces a sharp deceleration of the moving air which apparently enhances the mixing of the powdered coating material entering the chamber 56 through the feed passage 54.

After this thorough mixing is completed, the air-powder mixture proceeds down the length of the projecting gun 44, where it passes successively through each of the axially spaced transverse screens 62. These screens are positioned at the desired axial distance by internal tubular segments 64 spaced between the screens 62. The tubular segments 64 are held in position at the exit end of the gun 44 by an internal flange 66, and they are maintained in their desired axial, longitudinal spacing by the threaded lock ring 68, internally threaded into the inlet end of the tube 70, which is itself threaded into the mixing block 52 to provide the outlet passage from the expansion mixing chamber 56.

*Coating of internal container walls*

A container-coating embodiment of the apparatus of this invention is shown in FIGURE 4, where an open top container 114 is shown in position at a coating station, where heat is supplied. A projecting gun 116 incorporating a series of transverse flow-straightening screens 118 is positioned for substantially axial movement into and out of the interior of the heated container 114, again projecting a powder-carrying stream of air exhibiting laminar flow characteristics toward the surface to be coated. The exit orifice 120 of the projecting gun 116 is provided with a stream-diverting horn 122 having an inverted paraboloidal shape, but provided with an open input end 124 exposed to the flowing stream proceeding down the gun 116 and connected by the expanding body portion of the element 122 to an enlarged output aperture 126.

The expanding horn shape of the deflecting horn 122 tends to spread the powdered coating material passing therethrough outwardly in diverging directions, coating primarily the bottom inside surface 128 of the container 114. The outer surfaces of the horn-shaped element 122 coact with the flowing stream to spread the stream radially toward the inner side walls 130 of the container 114. The horn 122 has a minimum disturbing effect on the laminar-flow characteristics of the advancing powder-carrying air stream, and the divergence of the stream produces a smooth uniform coating fusing over the entire inner surface of container 114.

In the coating operation performed with apparatus shown in FIGURE 4, a new container 114 is placed in position and exposed to heat at the coating station, and the vertically movable coating gun 116 is lowered slowly into the container 114, telescoping downwardly within it until it reaches the vicinity of the bottom 128. The coating gun 116 is then raised slowly out of the container 114.

The container 114 is heated by any suitable means, such as induction heating coils surrounding its periphery or infrared heat lamps, and the temperature of the bottom 128 and walls 130 of the container 114 is selected to fuse the coating material projected toward the inside surfaces of the container by the gun 116. Thus when the gun 116 is raised out of the container 114, all inner surfaces have been smoothly and uniformly coated.

A vacuum shield 132 is shaped in the form of a tube substantially concentric with the gun 116, and has an open mouth 134 positioned near the open top of the container 114. Shield 132 has its upper end connected to the inlet of a blower or vacuum pump. The resulting flow of air upwardly into the mouth 134 and up the tube 132 carries with it any excess coating powder which does not adhere to the inner surfaces 128 or 130 of the container 114. The shield 132 thus acts like a vacuum hood, allowing excess coating powder to be returned to a supply, from which it may be recycled through the coating process without waste or loss of the excess coating material. In addition the shield 132 avoids the creation of back pressure or standing wave pressure barriers within the container 114 which might interfere with the laminar flow distribution of coating material toward the inner surfaces 128 and 130.

If desired, the shield 132 may be partially telescoped within the container 114 during the coating operation to minimize loss of coating material, as described below with respect to FIGURE 5.

A modified embodiment of the invention is shown in FIGURE 5, where a coating projecting gun 136 is movable upward and downward and is constructed in a manner similar to the gun 116 in FIGURE 4. In the assembly of FIGURE 5, however, a vacuum shield 138 is positioned surrounding the projecting gun 136 closely adjacent to the inner wall of the container 140 to be coated by the mechanism. A small air space 144 between the vacuum shield 138 and the inner wall of container 140 admits outside air to the container 140, where it passes into the vacuum shield 138 toward an exhaust. This inward flowing air diverts any particles of coating material traveling toward the upper portions of the container walls in the region of the passage 144, effectively "masking" this region to avoid deposit of a coating thereon.

In the operation of the embodiment shown in FIGURE 5, the projecting gun is generally retracted to the position **136*a* within the shield 138 at the end of each coating operation. The coated container 140 is removed and a new container 140 is placed in coating position as shown in FIGURE 5. The gun 136 then moves downward to its lower terminal position 136*b* and then returns to the retracted position 136*a* while continuously projecting the airpowder stream toward the inside surfaces of the container 140, after which the coated container is removed to complete the cycle. During this operation the shield 138 remains stationary in the position shown in FIGURE 5. By retracting projecting gun 136 into shield 138 during the changing of containers 140, the projected coating material is gathered and drawn away through the vacuum shield 138, minimizing waste. The container 140 is heated to allow the coating material to adhere and fuse on the coated surfaces while the vacuum shield 138 remains at a cooler temperature, below the melting point of the coating material, preventing deposit or buildup of the coating material drawn away inside the vacuum shield 138**.

*Re-deflector choke rings*

The flaring, horn-shaped deflectors 122 may be formed with a tapered central passage joining input end 124 to output aperture 126, as shown in FIGURE 4, providing direct delivery of powdered coating material through the horn during the entire coating operation.

More sensitive control of the delivered stream of coating material is provided by the dual-deflector devices of FIGURES 6–15. These incorporate a flaring central deflector 151 suspended by a spider of internal radial struts 152 to protrude slightly from the delivery orifice of a projection gun 153. Surrounding deflector 151 is a re-deflector choke ring 154 movable axially from an extended position shown in FIGURES 6 and 7 and by dash lines in FIGURE 14, where it extends beneath deflector 151, through intermediate positions shown in FIGURES 8 and 9, to a fully retracted position shown in FIGURE 10 and by solid lines in FIGURE 14, where ring 154 is withdrawn completely from the powder-bearing stream of gas issuing between the orifice of gun 153 and deflector 151.

As indicated in FIGURE 7, the extended choke ring 154 re-deflects the stream of gas axially to deliver the powdered material directly beneath gun 153. As shown in FIGURES 8, 9 and 10, progressive withdrawal of choke ring 154 permits wider lateral deflection of the gas stream by flaring deflector 151.

Axial movement of deflector gun

The assembly of gun 153, deflector 151 and choke ring 154 is moved axially by the mechanism shown in FIGURE 6, where the assembly is shown mounted on an axially movable ram 155 of a hydraulic or pneumatic cylinder (not shown) positioned over a heated container-supporting work station such as the heated collar 156.

The projection gun 153 is anchored to a mixing block 157 similar to mixing block 52 shown in FIGURE 1, and supplied with powdered coating material through a powder feed conduit 158, which is mixed in an expansion-mixing chamber within block 157 into an advancing stream of slow-moving gas, such as compressed air, introduced through a passage formed in an anchor block 159 and supplied by an air supply conduit 161. Anchor block 159 firmly secures mixing block 157 to ram 155, whose axial movement thus raises or lowers projection gun 153 inside the collar 156 at the underlying work station.

Re-deflector choke ring 154 is independently mounted on retraction rods 162 supported for axial movement by one or more actuators 163, which may be hydraulic, pneumatic or solenoid actuators, mounted on one of the assembled components supported by ram 155, such as mixing block 157, for example, as shown in FIGURE 6. Actuators 163 operate to withdraw or extend retraction rods 162 axially to move choke ring 154 relative to deflector 151 from the extended position of FIGURES 9 and 10 to the retracted position of FIGURES 10 and 14.

Alternative cross-sectional contours of choke rings 154A, 154B and 154C are shown in FIGURES 11, 12 and 13. Ring 154A has a smoothly concavely curved internal taper, with its inner re-deflecting surface substantially tangent to an axial right circular cylinder at its exit end 164A. Ring 154B has a re-entrant concave contour, with a diverging region blending smoothly into a slightly converging exit end 164B.

Ring 154C has a right circular cylindrical entrance leading to a diverging central taper followed by a larger right circular cylindrical exit end 164C. All of the re-deflectors or choke rings shown in FIGURES 11, 12 and 13 thus have a concavely shaped internal contour tending to re-deflect the gas stream from deflector 151 and re-guide it in an axial direction, as indicated in FIGURE 7, providing a deposit of entrained coating material on the bottom 165 of a can 166 or other container at the work station, held inside heated collar 156.

Partial retraction of re-deflector choke ring 154 by actuators 163 spreads the coating material more widely over bottom 165 (FIGURE 8) and further retraction allows deflector 151 to direct the stream of coating material past the internal corner and up the side walls of the container 166 (FIGURES 9, 10).

Where a thicker layer of coating material is desired along an internal side wall area parallel to the axis of withdrawal of gun 153 by ram 155, such as a rolled side wall seam 167 of a can wall (FIGURE 15), the convergence rod 168 is interposed in the path of the advancing stream of coating material to interrupt the flow pattern, as shown in the bottom plan view of FIGURE 15, causing adjacent streamlines first to divert around rod 168 and then to converge downstream behind it to supply a coating 169 on the wall of container 166 having a thicker portion 170 where the streamlines converge over seam 167.

Rod 168 may be anchored to gun 153 outside its delivery orifice and may be curved beneath and anchored to deflector 151 as shown in FIGURE 14, supplanting struts 152 if desired.

The apparatus of FIGURE 6 may also be used to supply a stream of hot gas to the inside of a fully coated container 166 to supplement and enhance the external heat supplied by heated collar 156, speeding the smoothing and curing time of plastic coatings 169. Retraction of choke ring 154 and withdrawal of gun 153 during the delivery of such a hot gas stream provides progressive localized heating over the bottom 165 and side walls of the can 166.

The operating advantages of the flow straightening systems shown in FIGURES 1, 4, 5, 6 and 14 are more fully described in my co-pending application Ser. No. 477,987. A highly effective straightening system in the preferred form of the invention employs six transverse screens 62 (FIGURE 1) with their "warps" and "woofs" aligned parallel.

These systems permit entrainment of large volumes of powdered coating material in the slow moving stream of gas passing through the gun 44. For example, an average rate of 300 grams of powder is delivered each minute by only 1.12 cubic feet of air, giving a powder-to-air weight ratio of 7.9 to 1, in one embodiment of the invention.

Furthermore, powdered coating material is delivered in a smooth, slow-moving stream, with minimum eddying and turbulence, traveling at such low velocities as 960 feet per minute for example. This permits optimum control of coating thickness and uniformity, and substantially avoids chilling of containers at the coating station, minimizing the heat energy required for fusing and curing the coating material.

While the objects of the invention are efficiently achieved by the preferred forms of the invention described in the foregoing specification, the invention also includes changes and variations falling within and between the definitions of the following claims.

I claim:

1. Apparatus for producing a flowing mixed stream of gas and powdered material comprising, in combination:
    (A) Means forming a mixing chamber having a gas feed passage and a powder feed passage opening therein along axes angularly displaced by an acute angle;
    (B) Means forming an elongated passageway having an input end opening into said chamber and an open output end;
    (C) A plurality of flow straigthening means spaced apart along said passageway between said ends;
    (D) A source of compressed gas connected to said gas feed passage;
    (E) And a smoothly-flaring deflector disposed beyond and facing the open output end of the passageway, in the path of the flowing mixed stream of gas and powdered coating material issuing from the passageway and having its widest radial diameter at its downstream end, whereby gas and powder introduced through the respective passages into said chamber are moved along the passageway and past the deflector in a flowing stream exhibiting substantially laminar flow characteristics.

2. The combination defined in claim 1 in which said flow-straightening means include transverse mesh screens spanning said passageway.

3. The apparatus defined in claim 1 in which said open output end is positioned facing the internal surface of a concave object to be coated, and including heating means supplying heat to the surface of the object to be coated whereby said powdered material reaching said surface will fuse thereon to form a uniform coating.

4. The apparatus defined in claim 1 including an enlarged cylindrical shield surrounding said passageway and having an open intake end close to the open output end of said passageway, and an exhaust end connected to a powder return system.

5. The combination defined in claim 4 in which said passageway and said shield member are movable into and out of the inside of a container, whereby the flowing stream of powdered coating material is directed toward the inner surface of the container and excess coating material is drawn away inside said shield through said powder return system.

6. The apparatus defined in claim 1 in which said deflector incorporates a flaring surface of revolution having its axis substantially concentric with said passageway and disposed in the path of said flowing mixed stream of gas and powdered coating material issuing from said passageway.

7. The apparatus defined in claim 1 including a substantially ring-shaped re-deflector positioned near the output end of the elongated passageway and mounted for movement from a fully-extended position beyond the end of the flaring deflector, to a fully-retracted position withdrawn from the mixed stream of gas and powdered material flowing from the output end of the passageway past the flaring deflector.

8. The apparatus defined in claim 1 including a convergence rod positioned in a substantially radial plane and interposed in the mixed stream of gas and powdered material flowing from the output end of the passageway past the flaring deflector.

9. The apparatus defined in claim 7 including traversing means connected to move the output end of the elongated passageway between an extended position inside a concave container to a retracted position outside the container, and actuating means supporting the re-deflector for axial movement relative to the output end of the elongated passageway.

References Cited

UNITED STATES PATENTS

| | | | |
|---|---|---|---|
| 1,830,598 | 11/1931 | Fagan | 117—18 |
| 2,002,701 | 5/1935 | McWane | 17—18 |
| 2,094,242 | 9/1937 | Parker | 117—18 |
| 2,336,946 | 12/1943 | Marden et al. | 117—18 |
| 2,604,872 | 7/1952 | Brown | 118—317 X |
| 2,682,032 | 6/1954 | Dehn et al. | 118—317 X |
| 2,739,424 | 3/1956 | Fritze | 118—306 X |
| 2,814,083 | 11/1957 | Beyer | 118—306 X |
| 2,827,009 | 3/1958 | Norris | 118—317 X |
| 2,995,462 | 8/1961 | Meister et al. | 117—18 X |
| 3,311,085 | 3/1967 | Smith | 118—301 X |

WALTER A. SCHEEL, *Primary Examiner.*

J. P. McINTOSH, *Assistant Examiner.*

U.S. Cl. X.R.

118—317